US00RE37099E

(19) United States
(12) Reissued Patent
Hanada

(10) Patent Number: US RE37,099 E
(45) Date of Reissued Patent: Mar. 20, 2001

(54) BRAKE APPARATUS FOR A BICYCLE

(75) Inventor: Mitsugu Hanada, Sakai (JP)

(73) Assignee: Shimano, Inc., Osaka (JP)

(21) Appl. No.: 08/869,593

(22) Filed: Jun. 5, 1997

Related U.S. Patent Documents

Reissue of:
(64) Patent No.: 5,421,435
Issued: Jun. 6, 1995
Appl. No.: 08/018,409
Filed: Feb. 17, 1993

(30) Foreign Application Priority Data

Mar. 23, 1992 (JP) ..... 4-064691

(51) Int. Cl.[7] ..... G05G 7/00; B62L 3/02; F16H 59/04

(52) U.S. Cl. ..... 188/24.14; 74/388 R

(58) Field of Search ..... 68/24.11, 24.14, 68/26; 192/6 R; 74/388 R

(56) References Cited

U.S. PATENT DOCUMENTS

| | | | | |
|---|---|---|---|---|
| 1,512,362 | * | 10/1924 | Phelps | 267/161 |
| 2,517,847 | * | 8/1950 | Crossland | 192/6 R |
| 2,569,718 | * | 10/1951 | Hooykaas | 192/6 R |
| 2,892,521 | * | 6/1959 | Spencer | 188/26 |
| 4,109,762 | * | 8/1978 | Wood | 178/26 |
| 4,313,507 | * | 2/1982 | Hays | 177/1 |
| 4,428,179 | * | 1/1984 | Jordan et al. | 177/50 |
| 4,632,254 | * | 12/1986 | Scopatz | 209/592 |
| 4,815,679 | * | 3/1989 | Perry | 244/111 |
| 4,836,310 | * | 6/1989 | Yamano | 177/25.18 |
| 5,074,436 | * | 12/1991 | Inoue | 177/25.18 |
| 5,201,236 | * | 4/1993 | Nagano | 74/388 R |
| 5,270,495 | * | 12/1993 | Mosher et al. | 177/25.18 |
| 5,319,160 | * | 6/1994 | Nambu | 177/25.18 |
| 5,719,355 | * | 2/1998 | Nishimura | 177/25.18 |
| 5,760,342 | * | 6/1988 | Takeda et al. | 177/25.18 |

FOREIGN PATENT DOCUMENTS

| | | | | |
|---|---|---|---|---|
| 2817359 | * | 10/1978 | (DE) | 188/26 |
| 2819471 | * | 11/1978 | (DE) | 188/26 |
| 0065820 | * | 12/1982 | (EP) . | |
| 482559 | * | 4/1992 | (EP) . | |
| 334512 | * | 12/1903 | (FR) . | |
| 2 116 732 | * | 9/1983 | (GB) . | |
| WO 8302002 | * | 6/1983 | (WO) . | |

* cited by examiner

*Primary Examiner*—Chris Schwartz
(74) *Attorney, Agent, or Firm*—James A. Deland

(57) ABSTRACT

A brake apparatus for use on a hub shaft (11) supporting a hub (2) of a bicycle has a brake ring (13), and a coupling device for coupling the brake ring and the hub to rotatable together. The coupling device includes outer splines (13a) formed on the brake ring (13) and inner splines (2d) formed in the hub (2) to allow relative axial movement between the brake ring (13) and hub (2) while preventing relative rotation therebetween. The brake apparatus includes brake shoes (6) disposed inside the brake ring (13) to be movable into contact with the brake ring (13). A restrictor is provided far restricting axial movement of the brake shoes (6) relative to the brake ring (13). The restrictor includes stoppers (27a) projecting radially outwardly from peripheral positions of an annular shoe presser spring (27) fitted circumferentially of the brake shoes (6), and grooves (13b) formed in an inner peripheral wall of the brake ring (13). The brake apparatus further includes a brake controller (7) for varying a radial distance of the brake shoes (6) from an axis of the hub shaft (11).

24 Claims, 12 Drawing Sheets

BRAKE APPARATUS FOR A BICYCLE

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

This invention relates to a brake apparatus for a bicycle including a main brake body having a braking device and a brake controller, in which the brake controller is operable to switch the braking device between a braking position and a release position.

DESCRIPTION OF THE RELATED ART

As shown in FIG. 14, a conventional brake apparatus for a bicycle includes a brake ring 13 engaged with an outer periphery at one end of a hub 2, so that the brake ring 13 forms a part of the hub 2. Brake shoes 6 acting as a braking device and other components of a main brake body 100 are assembled to the hub 2 in a separate process from assembly of the brake ring 13. FIG. 15 shows another conventional brake apparatus in which a brake ring 13 is formed integral with a hub 2. With a main brake body 100 assembled to the hub 2, the brake apparatus, brake ring and hub may be carried together as a unit.

With the former, it is necessary to assemble the brake ring 13 and main brake body 100 to the hub 2 in separate steps. This assembly operation tends to be of poor efficiency with displacements of the respective components occurring at a time of adjustment.

In the latter case, the three components of the bicycle are handled as a unit which is heavy. Another disadvantage of this construction is that the end of the hub where the brake apparatus and brake ring are attached is bulky, and particularly large in diameter. It is difficult to handle the bulky construction packed for transportation.

SUMMARY OF THE INVENTION

An object of the present invention is to provide a brake apparatus easy to assemble and adjust, and easy to transport and handle.

In order to fulfill the above object, the present invention is characterized by the following three features:

1) A braking device forming the brake ring is provided as a separate component from the bicycle hub.
2) A coupling device is provided to connect the brake ring to the hub to be rotatable together.
3) A restrictor is provided to interconnect the brake ring and the main brake body into an integral unit to be inseparable from each other.

The feature 1) allows the hub to be packed and transported separately from the brake ting. The coupling device of feature 2) is provided to facilitate connection of the brake ring to the hub. In a preferred embodiment of the invention, the coupling device includes outer splines formed on the brake ring and inner splines formed in the hub. In the preferred embodiment, the restrictor of feature 3) includes an annular shoe presser spring fitted circumferentially of the brake shoes, and grooves formed in an inner peripheral wall of the brake ring for receiving the presser spring. The brake apparatus has the brake ring and main brake body connected together through engagement between the presser spring and one of the grooves. This construction reduces the possibility of adjustment errors such as a displacement between each brake component and brake ring occurring when the brake apparatus is assembled to the hub, and realizes improved assembling efficiency.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show a brake apparatus for a bicycle according to the present invention, in which.

DETAILED DESCRIPTION OF THE PREFERRED EMBODIMENT

Figure 1:
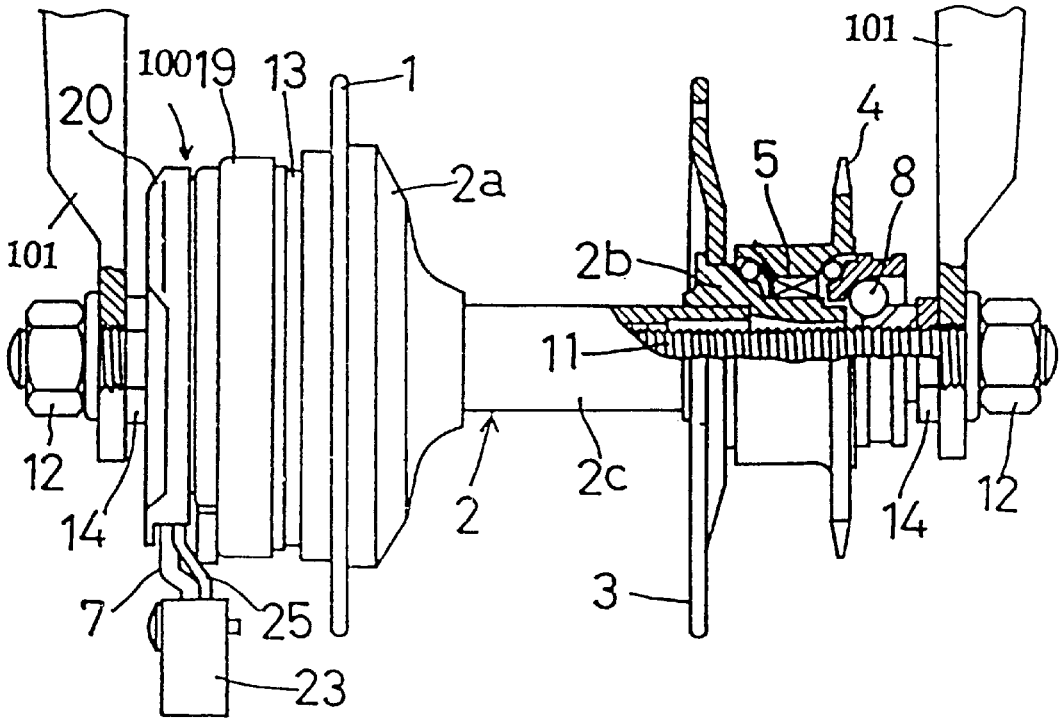
FIG. 1 is a front view of a hub having a brake apparatus for a bicycle according to the present invention.

As shown in FIG. 1, a bicycle hub 2 includes a left cover 2a having a spoke connecting flange 1, an inner element 2b having a spoke connecting flange 3 and a ratchet mechanism 5 for interlocking a drive gear 4 and the inner element 2b, and a pipe portion 2c interconnecting the left cover 2a and inner element 2b.

Figure 3:
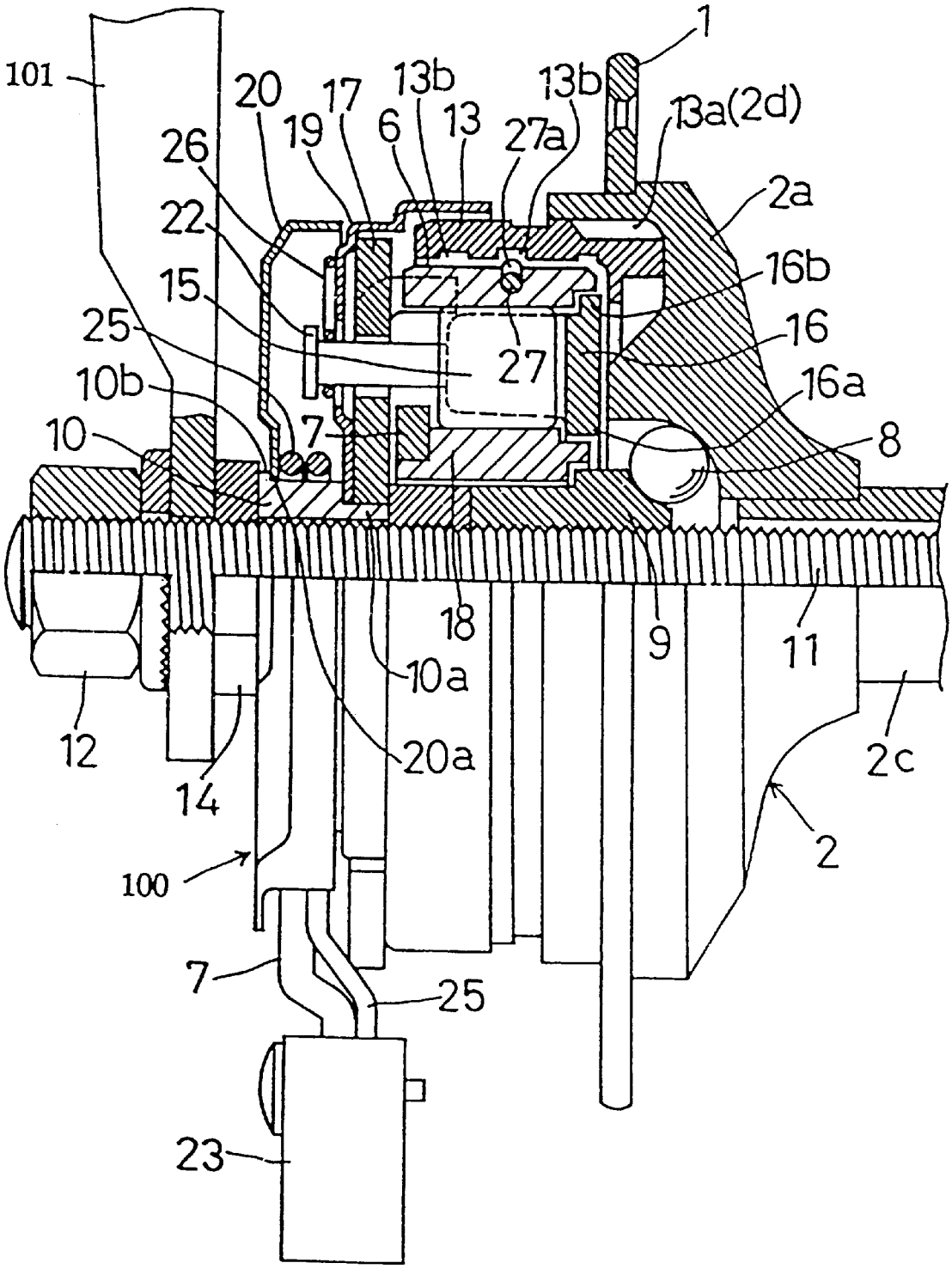
FIG. 3 is a view, partly in section, of the brake apparatus as assembled.

As shown in FIG. 3, the left cover 2a has a brake apparatus assembled thereto and including brake shoes 6 and a brake controller 7. The hub 2 is supported by a hub shaft 11 through balls 8 and ball pressers 9. The brake apparatus is supported by the hub shaft 11 through a bush 10.

The hub shaft 11 has mounting nuts 12 screwed to opposite ends thereof for securing the brake apparatus and hub 2 to bicycle frames 101 connected to the hub shaft 11. The above components constitute a brake and hub assembly of a bicycle.

As shown in FIG. 3, the brake apparatus includes a main brake body 100 having the brake shoes 6, brake controller 7 and other components, and a brake ring 13 coupled to the hub 2. A basic brake operation is based on a mechanism in which the main brake body 100 applies a frictional braking force to the brake ring 13, thereby to brake the hub 2. The construction and working of this apparatus will be described in detail hereunder.

Figure 4:
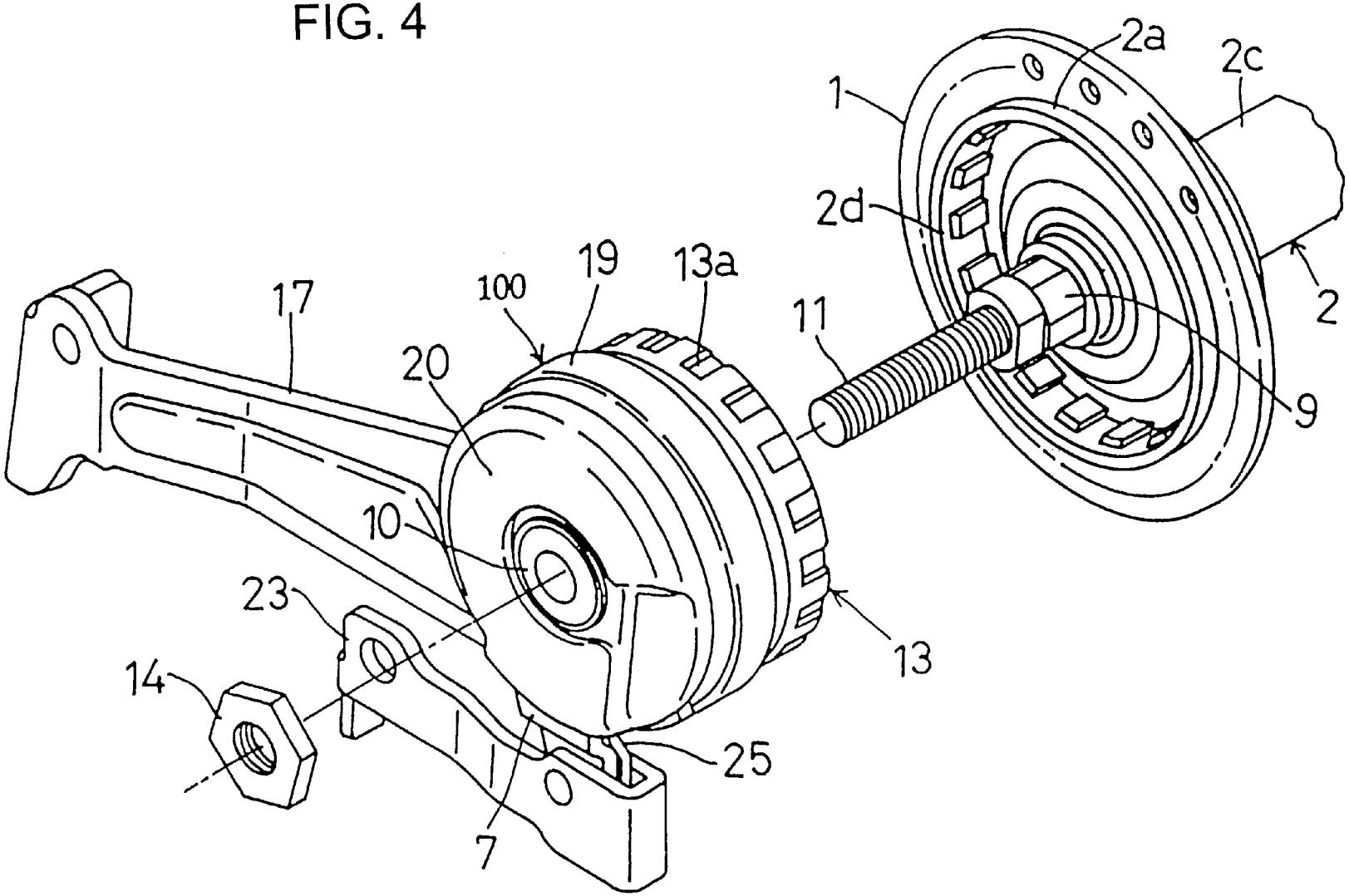
FIG. 4 is a perspective view of the brake apparatus separated from the hub.
Figure 5:
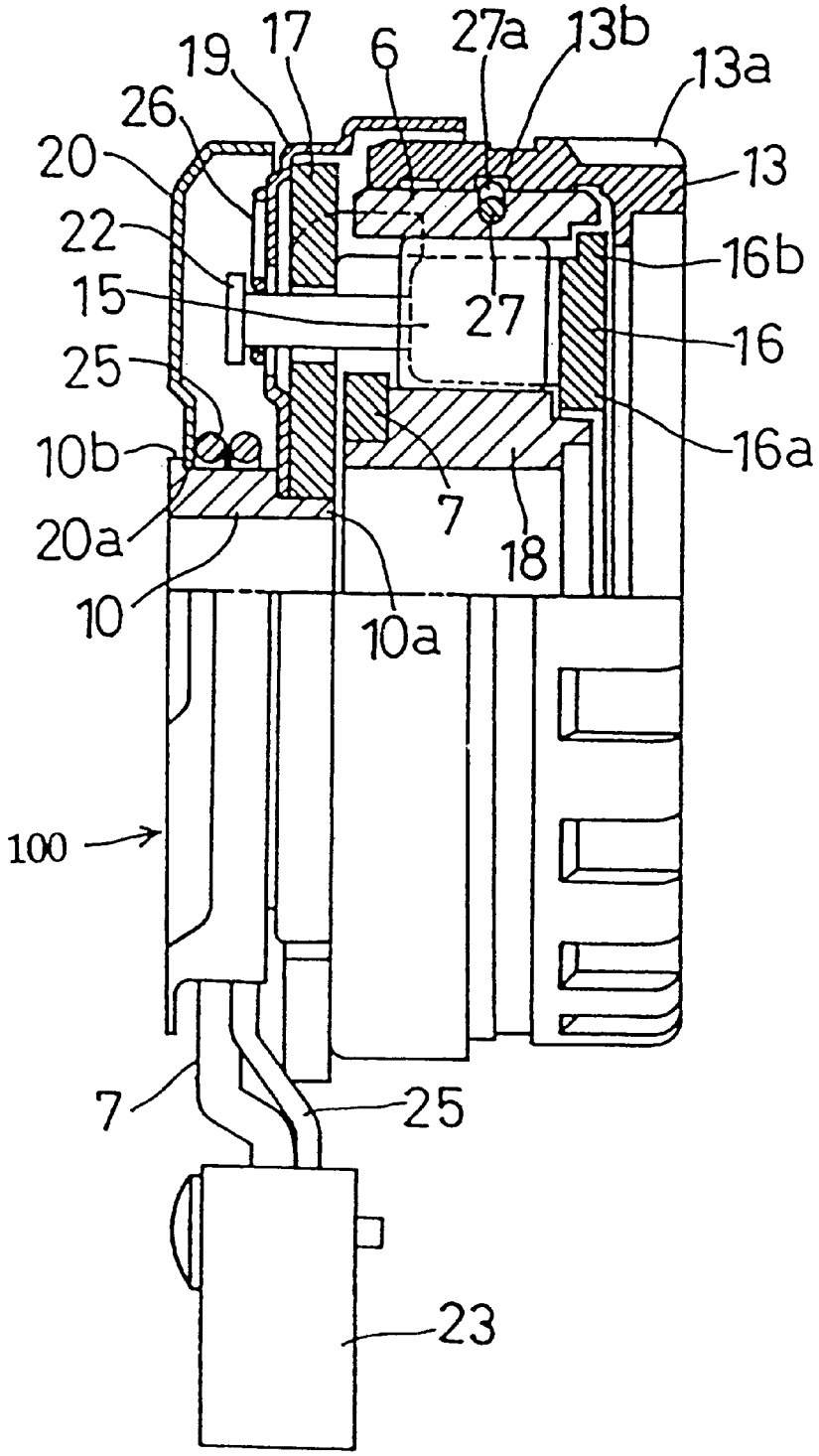
FIG. 5 is a view, partly in section, of the brake apparatus.
Figure 6:
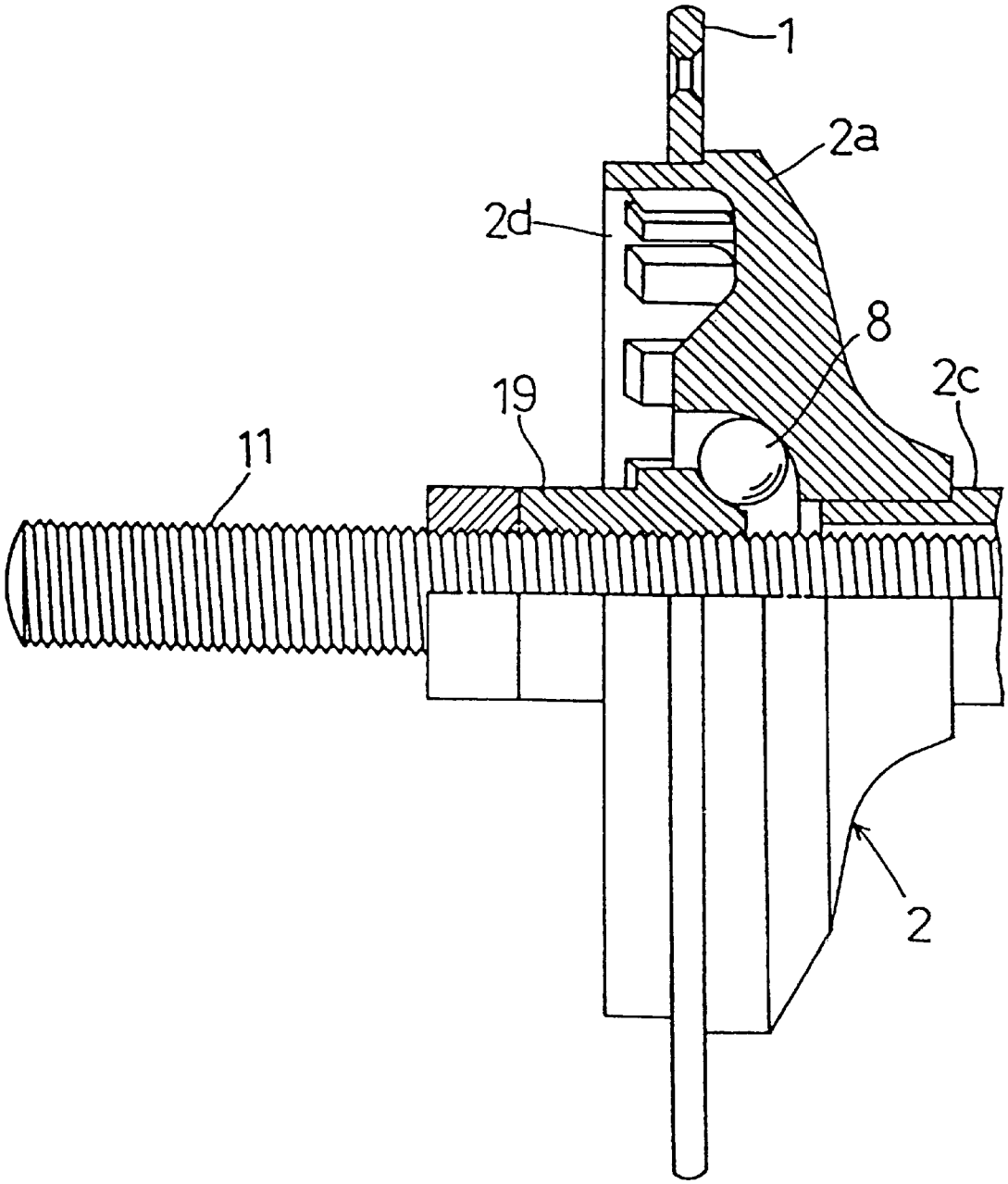
FIG. 6 is a view, partly in section, of a coupling portion of the hub.

The brake ring 13 is in the form of a braking body which is a separate component from the left cover 2a As shown in FIGS. 4 and 5, the brake ring 13 has splines 13a formed on an outer peripheral surface at one end thereof. These splines 13a are fitted in a coupling portion of the left cover 2a defining splines 2d as shown in FIGS. 4 and 6. The brake ring 13 is fixed to the hub shaft 11 by a pair of lock nuts 14 mounted on opposite end regions of the hub shaft 11. The brake ring 13 is interlocked to the left cover 2a through the splines 13a and 2d to be rotatable therewith.

Figure 7:
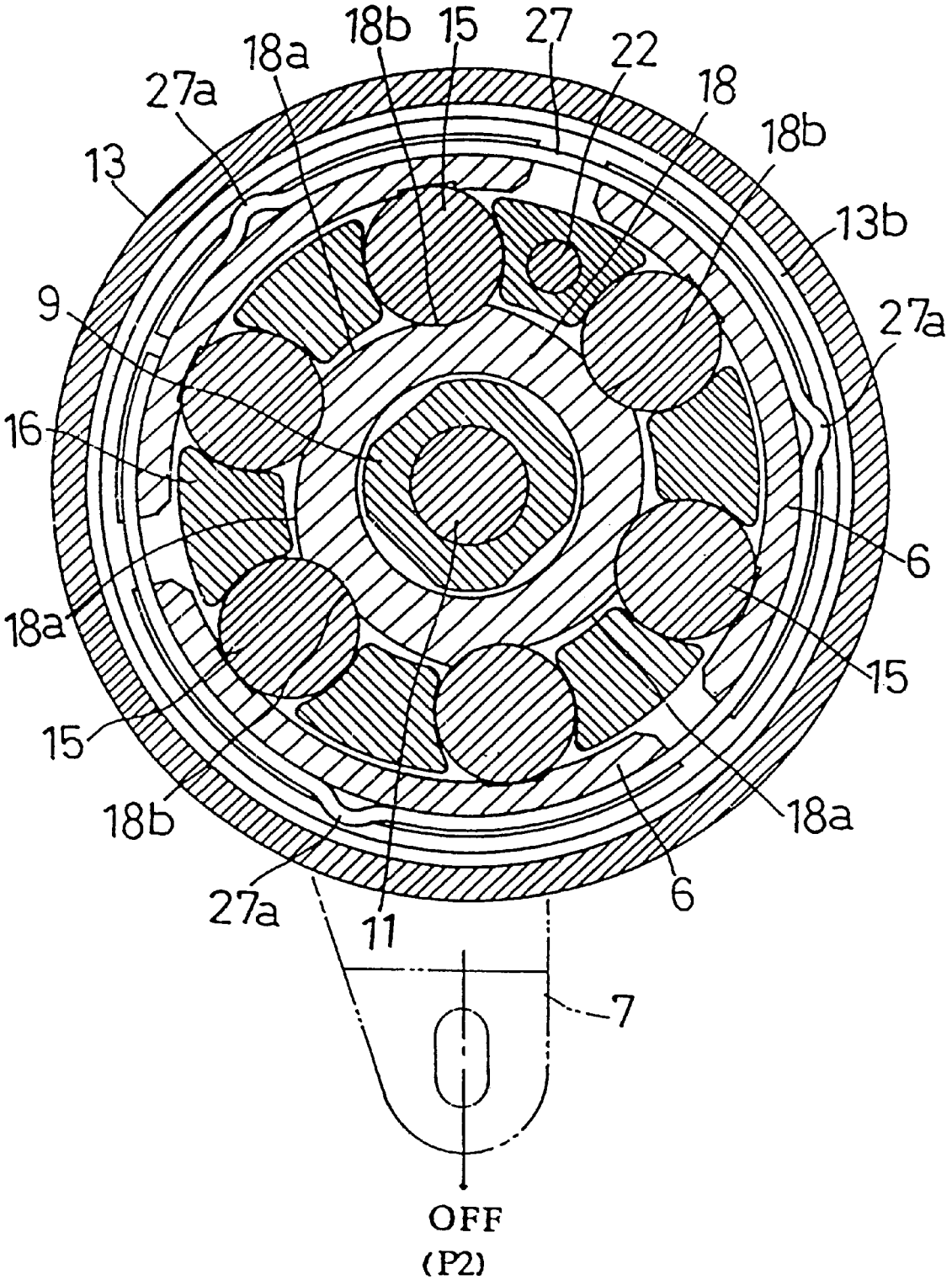
FIG. 7 is a sectional view of a roller assembly of the brake apparatus in an OFF position (second position)

As shown in FIGS. 3 and 7, the main brake body 100 includes a plurality of brake shoes 6 and rollers 15 arranged in the circumferential direction of the brake ring 13 and supported by a brake frame 17 through a roller case 16, and a rotary cam 18 mounted inwardly of the roller case 16 to be rotatable about an axis of rotation of the hub 2 to operate the brake shoes 6. The rotary cam 18 is rotatable by the brake controller 7 to switch the main brake body 100 between a braking position and a release position. For consistency of terminology used in this specification, the term "first position P1" corresponds to a position of the brake controller 7 to apply the braking force, and "second position P2" corresponds to a position not to apply the braking force. In addition to the first and second positions, the main brake body 100 has a third position P3 which will be described later.

Figure 2:
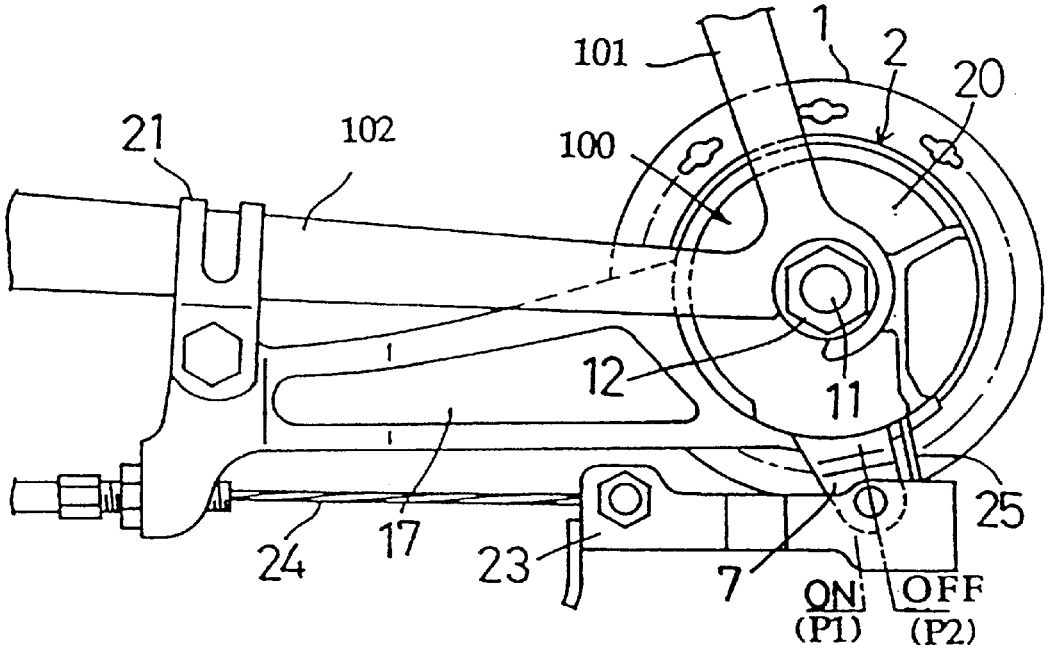
FIG. 2 is a side view of the brake apparatus.

As shown in FIGS. 2 and 3, the brake frame 17 has one end thereof supported by the hub shaft 11 through the bush 10. A waterproof cap 19 and an ornamental cap 20 [am] *are* attached to this end of the brake frame 17. The other end of the brake frame 17 is supported by a chain stay 102 of the bicycle frame 101 through a clamp band 21. Thus, the brake frame 17 is in a fixed position relative to the bicycle frame 101 despite a reaction resulting from a braking operation. As shown in FIG. 7, the roller case 16 accommodates all the rollers 15. The roller case 16 has a fixed pin 22 extending through and contacting the brake frame 17. The roller case 16 has a range of strokes determined by a circumferential dimension of a bore for receiving the fixed pin 22. The fixed pin 22 serves to limit circumferential movement of the roller case 16 to the above range of strokes relative to the brake frame 17. With the above construction, the rollers 15 are supported to be immovable circumferentially of the brake ring 13 during a braking operation. The circumferentially immovable rollers 15 push the brake shoes 6 radially outwardly toward the brake ring 13.

The brake controller 7 extends through the brake frame 17 and rigidly interlocked to the rotary cam 18, with one end of the brake controller 7 engaged with the rotary cam 18. The other end of the brake controller 7 projects outwardly from the caps 19 and 20. As shown in FIG. 2, a cable coupler 23 is attached to the end of the brake controller 7 projecting from the caps 19 and 20, and a brake cable 24 is connected to the coupler 24. By a force applied through the brake cable 23, the brake controller 7 is pivotable about the axis of rotation of the hub 2.

As shown in FIG. 2, when the brake cable 24 is pulled, the resulting tension switches the brake controller 7 to the braking position ON (first position P1). When the brake cable 24 is relaxed, the brake controller 7 is switched to the OFF position (second position P2) shown in FIG. 2, under the force of a return spring 25 acting on the cable coupler 23.

When the brake controller 7 is switched from the second position P2 to the first position P1, the rotary cam 18 is rotated relative to the rollers 15. As shown in FIG. 7, the rotary cam 18 has brake applying cam portions 18a formed peripherally thereof which push the rollers 15 radially outwardly of the roller case 16. The rollers 15 pushed out apply a pressing force to the brake shoes 6, whereby the brake shoes 6 are pressed on an inner peripheral wall of the brake ring 13 to brake the latter.

When the [broke] *brake* controller 7 is switched from the first position P1 to the second position P2, the rotary cam 18 rotates to the position shown in FIG. 7. The rollers 15 rest in [broke] *brake* canceling recesses 18b of the rotary cam 18 (that is, the rollers 15 are retracted into the roller ease 16) as a result of the rotation of the rotary cam 18, under a biasing force of the roller ease 16 produced by a return spring 26 acting on the fixed pin 22, and by returning action of an annular shoe presser spring 27 extending [eircumferentially] *circumferentially* of and contacting all the brake shoes 6. This cancels the braking action of the brake shoes 6 applied to the brake ring 13.

Figure 8:
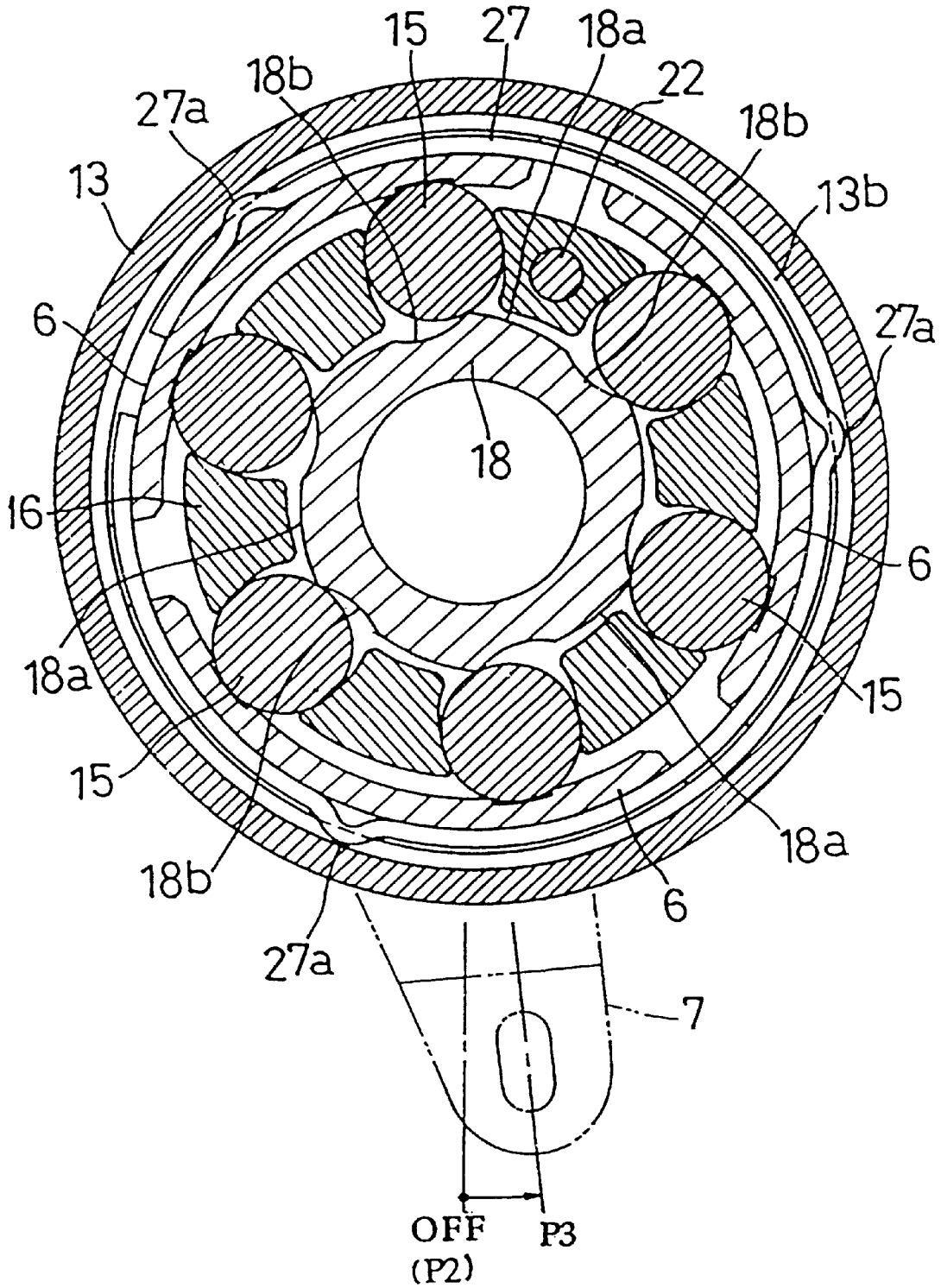
FIG. 8 is a sectional view of the roller assembly of the brake apparatus in a non-use position (third position)
Figure 11:
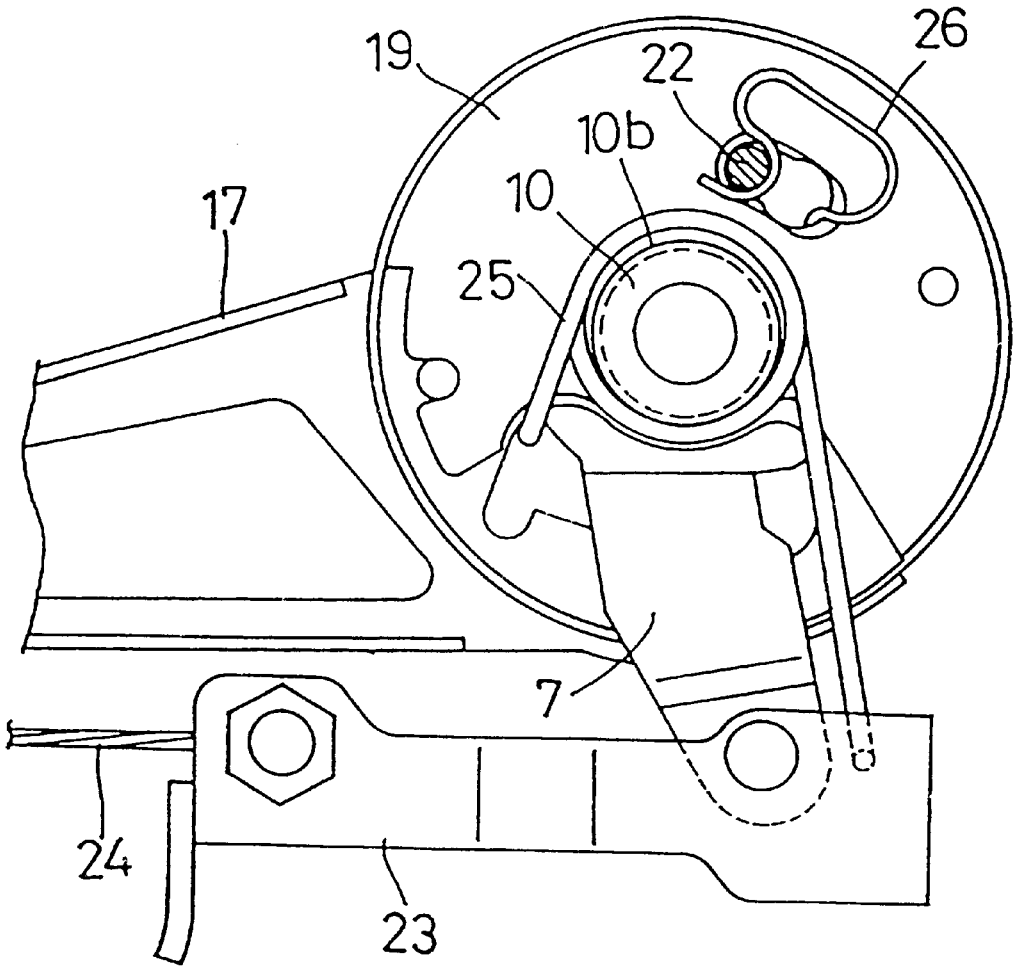
FIG. 11 is a side view showing return springs.

As shown in FIG. 8, the brake controller 7 lies in a non-use position opposed to the first and second positions P1 and P2 under the force of the return spring 25 when the brake cable 24 is not connected or when the brake cable 24 is connected but adjustment is not made yet. This non-use position is called the third position P3 in this specification. As shown in FIGS. 3 and 11, the roller ease 16 is biased in a fixed direction by the return spring 26 acting on the fixed pin 22.

As shown in FIG. 3, the bush 10 has an inward end 10c, and a stopper 10b projecting from the other end thereof. The inward end 10a is press fit into the brake frame 17, whereby the bush 10 is assembled securely.

Figure 12:
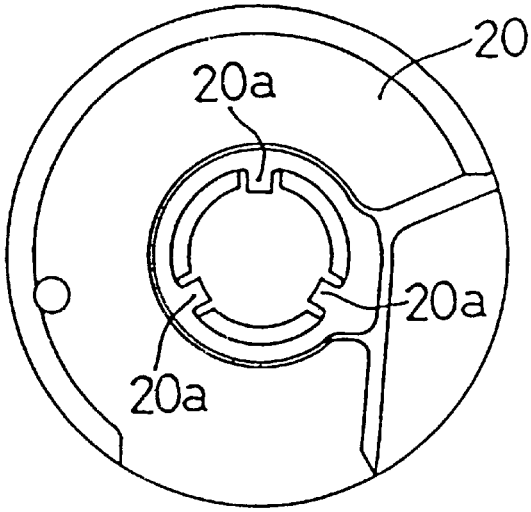
FIG. 12 is a side view of an ornamental cap.
Figure 13:
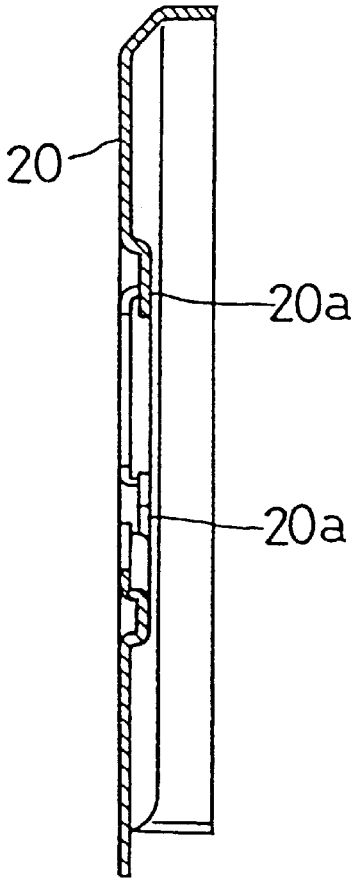
FIG. 13 is a sectional view of the ornamental cap.
Figure 14:
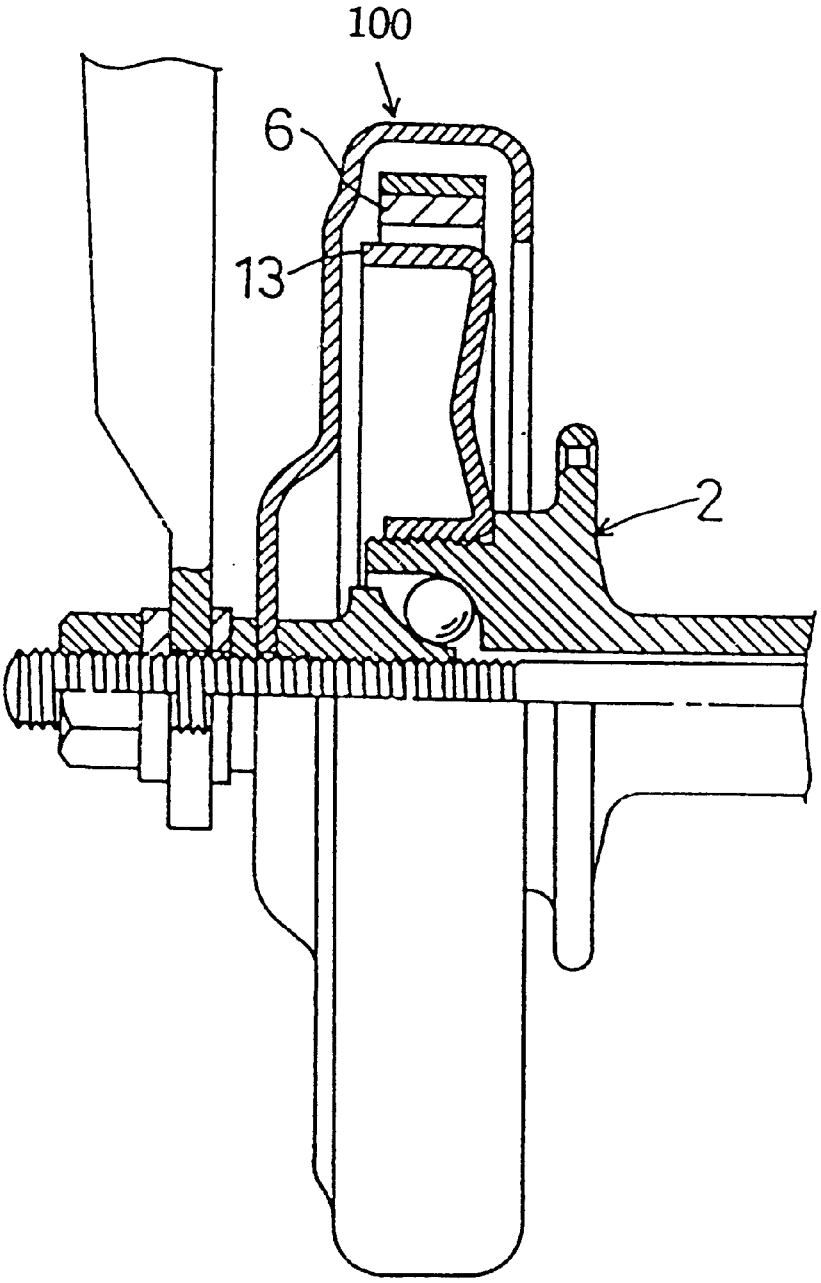
FIG. 14 (PRIOR ART)
FIG. 14 is a view, partly in section of a hub having a brake apparatus according to the prior art.
Figure 15:
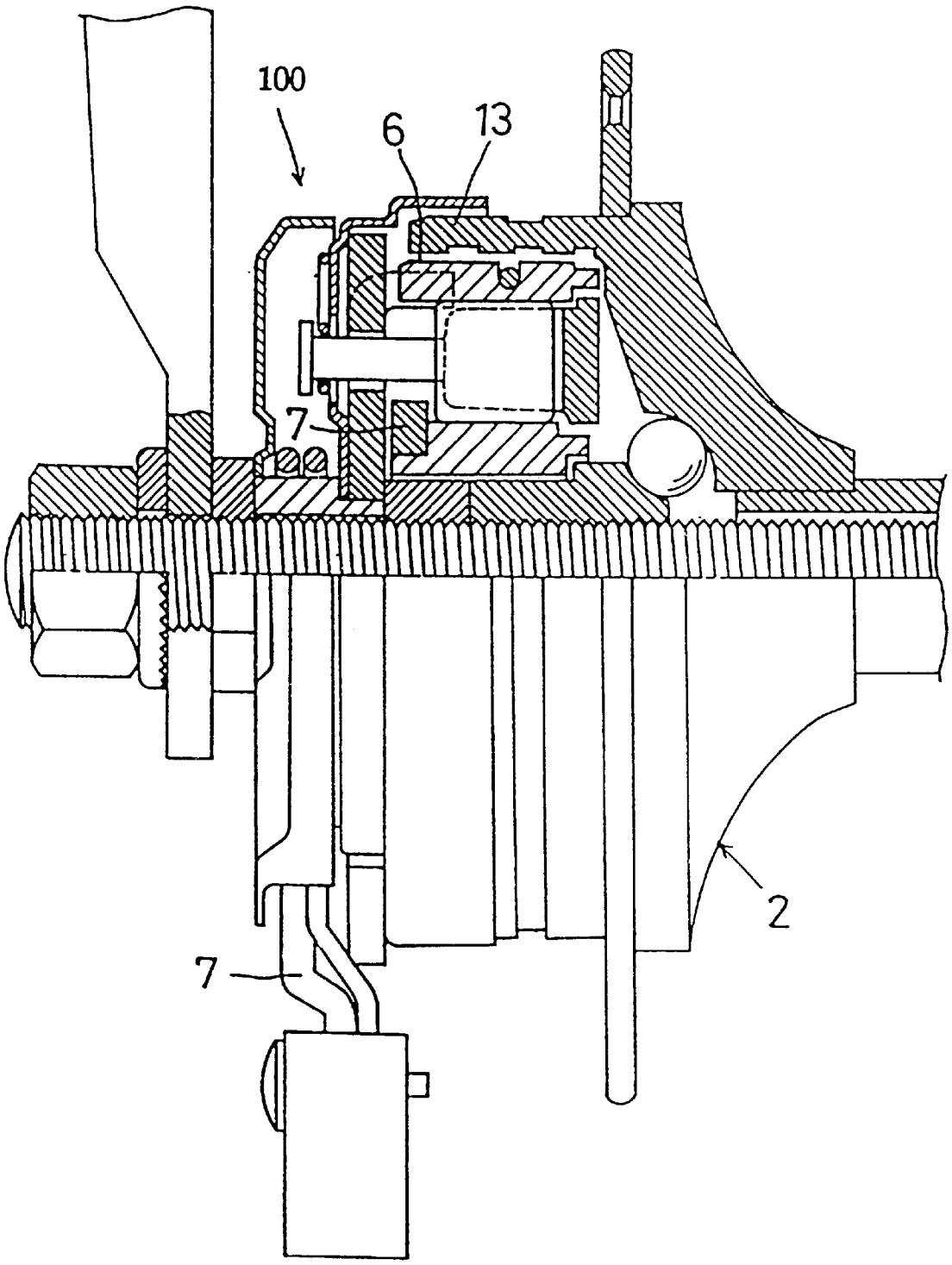
FIG. 15 (PRIOR ART)
FIG. 15 is a view, partly in section of another example of hub and brake apparatus according to the prior art.

The stopper 10b formed on the outward end of the bush 10 serves to hold the ornamental cap 20 in place. When the ornamental cap 20 is assembled to the bush 10, the ornamental cap 20 is elastically deformed to override the stopper 10b before fitting in place. As shown in FIGS. 12 and 13, the ornamental cap 20 has a plurality of lugs 20a for contacting the stopper 10b. Thus, the ornamental cap 20 is not easily separable from the bush 10. The waterproof cap 19 is mounted on the end of the bush 10 press fit into the brake frame 17, and is sandwiched between the bush 10 and brake frame 17. The return spring 25 is fitted on the bush 10 between the two caps 19 and 20. The brake controller 7 extends through the brake frame 17 and is securely assembled to the brake frame 17 along with the caps 19 and 20, bush 10 and return spring 25.

As shown in FIG. 11, the return spring 26 is engaged with the waterproof cap 19 and fixed pin 22, so that the fixed pin 22 is not movable out of the waterproof cap 19 toward the brake frame 17. With the fixed pin 22 not movable out of the waterproof cap 19, the roller case 16 is assembled to the brake frame 17 along with a case stopper 16a and waterproof cap 19.

Figure 9:
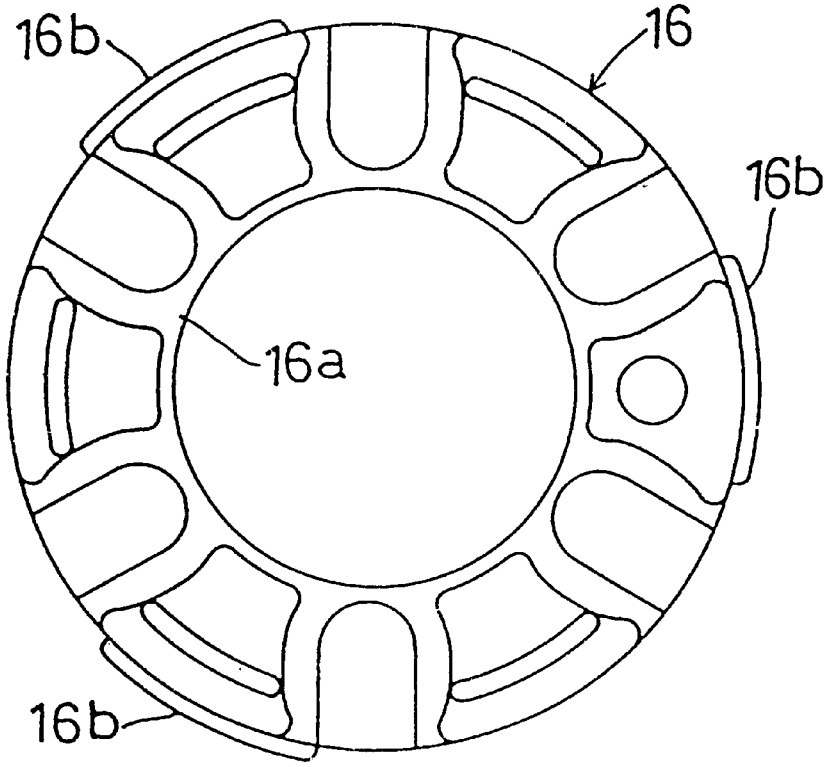
FIG. 9 is a side view of a roller case of the brake apparatus.
Figure 10:
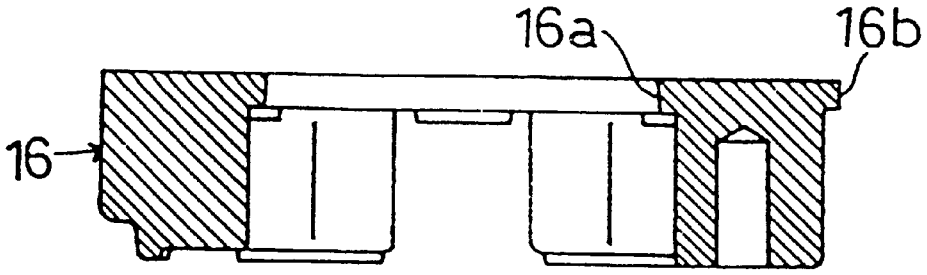
FIG. 10 is a sectional view of the roller case.

As shown in FIGS. 9 and 10, the roller case 16 includes a first stopper 16a projecting from an inner end thereof for acting on the rotary cam 18, and second stoppers 16b projecting from an outer end thereof for acting on the brake shoes 6. The first stopper 16a of the roller case 16 assembled to the brake frame 17 contacts an end of the rotary cam 18, so that the rotary cam 18 is not movable out of the roller case 16 toward the hub 2. The second stoppers 16b of the roller case 16 contact ends of the brake shoes 6 to prevent the brake shoes 6 from becoming displaced from the rollers 15 toward the hub 2.

By the contacting action of the first and second stoppers 16a and 16b, the brake shoes 6, roller case 16 and rotary cam 18 remain assembled to the brake frame 17.

According to the above construction, all the components of the main brake body 100, such as the brake shoes 6 and brake controller 7 remain assembled together even when the brake apparatus is detached from the hub 2.

As shown in FIGS. 7 and 8, the shoe presser spring 27 includes stoppers 27a for acting on the brake shoes 6. As shown in FIG. 3, the brake ring 13 has grease holding grooves 13b formed in the inner peripheral wall thereof. When the brake controller 7 is shifted to the third position P3 as shown in FIG. 8, the rotary cam 18 moves to the position shown in FIG. 8 with the movement of brake controller 7 from the second position P2 to the third position P3. In this position, ends of the brake applying cam portions 18a of the rotary cam 18 opposite the ends thereof used in applying the braking force contact the rollers 15 to press the brake shoes 6 on the brake ring 13. By this pressing action, the stoppers 27a of the shoe presser spring 27 enter one of the grease holding grooves 13b of the brake ring 13 to engage the brake ring 13. As a result, the brake shoes 6 are securely engaged with the brake ring 13. The viscosity of grease present in the groove 13b also promotes adhesion to the brake ring 13 of the brake shoes 6, which allows the brake shoes 6 to support the brake ring 13.

Thus, the shoe presser spring 27 acts as an engaging device for allowing the brake shoes 6 to securely support the brake ring 13 when the brake controller 7 is in the first position P1 or the third position P3.

With the above construction, as shown in FIGS. 4 and 5, the brake ring 13 and main brake body 100 remain assembled together even when the brake apparatus is detached from the hub 2. The main brake body 100 and brake ring 13 constituting the brake apparatus do not separate from each other, so that the brake apparatus may be assembled to the hub 2 in a single operation.

The foregoing embodiment may be modified with respect to the coupling device and braking device. In the foregoing embodiment, the coupling device is in the form of splines 13a and 2d for coupling the brake ring 13 and hub 2 to be rotatable together. The coupling device may employ other structures such as screws or caulking. The braking device may comprise a brake band and a cam as replacement for the brake shoes 6 and rollers 15, respectively.

What is claimed is:

1. A brake apparatus for a bicycle, comprising:

a hub shaft, and means for fixedly mounting said hub shaft on a frame of said bicycle;

a hub rotatably mounted on said hub shaft;

brake shoe means disposed on said hub shaft, said brake shoe means being non-rotatable relative to said hub shaft;

a brake ring having a contact surface for contacting said brake shoe means, said brake ring being located radially outwardly of said brake shoe means with respect to said hub shaft, such that said brake shoe means is located between said brake ring and said hub shaft;

coupling means located radially between said brake ring and said hub for coupling said brake ring and said hub to be rotatable together, and preventing said brake ring from rotating relative to said hub;

restrictor means for restricting movement of said brake shoe means relative to said brake ring axially of said hub; and brake control means for varying a radial distance of said brake shoe means from an axis of said hub shaft.

2. A brake apparatus as defined in claim 1, further comprising unitary means for allowing installation of said brake ring, said brake shoe means and said brake control means as a unit.

3. A brake apparatus as defined in claim 2, wherein said brake control means includes rollers for pushing said brake shoe means radially outwardly, a roller case for retaining said rollers, and a rotary cam for actuating said rollers.

4. A brake apparatus as defined in claim 3, wherein said roller case has a first stopper for preventing said rotary cam from being separated from said roller case, and a second stopper for preventing said brake shoe means from being separated from said roller case.

5. A brake apparatus as defined in claims 4, wherein said unitary means includes said restrictor means, said first stopper and said second stopper.

6. A brake apparatus as defined in claim 4, wherein said first stopper and said second stopper are flanges extending radially from said roller case.

7. A brake apparatus as defined in claim 1, wherein said coupling means includes first [grooves] *splines* extending substantially in a direction of said hub shaft and provided on an inside face of said hub, and a plurality of second [grooves] *splines* that engage said first [grooves] *splines*.

8. A brake apparatus as defined in claim 1, wherein said restrictor means is located between said brake ring and said brake shoe means.

9. A brake apparatus as defined in claim 8, wherein said restrictor means includes a spring for biasing said brake shoe means radially inwardly toward said hub shaft and a groove defined in said brake ring, said spring being located within said groove.

*10. A brake apparatus for coupling to and use with a bicycle hub that rotates around a hub shaft, said brake apparatus comprising:*

*a rotatable brake ring having a contact surface and a coupling element, said coupling element having a coupling structure which allows said brake ring to couple to said bicycle hub such that said coupling element is located radially between said brake ring and said hub and such that a relative rotation of said brake ring with respect to said bicycle hub is prohibited whenever said coupling element engages said bicycle hub while allowing said brake ring to be moved axially with respect to said bicycle hub during assembly to and disassembly from said bicycle hub;*

*brake shoe means located radially inside said brake ring; and*

*a brake control mechanism for moving said at least one brake shoe into braking contact with said contact surface of said brake ring.*

*11. A brake apparatus as in claim 10 wherein said coupling element, brake ring, at least one brake shoe, and brake control mechanism form part of a unitary assembly which is connectable as a unit to said hub shaft and said hub of said bicycle.*

*12. A brake apparatus as in claim 11 further comprising a support bushing for coupling said unitary assembly to said hub shaft of said bicycle.*

*13. A brake apparatus as defined in claim 12, wherein said brake control mechanism includes rollers for pushing said brake shoe means radially outwardly and into contact with said brake ring, a roller case for retaining said rollers, and a rotary cam for actuating said rollers.*

*14. A brake apparatus as defined in claim 13, wherein said roller case has a first stopper for preventing said rotary cam from being separated from said roller case, and a second stopper for preventing said brake shoe from being separated from said roller case.*

*15. A brake apparatus as defined in claim 14, wherein said unitary assembly includes said first stopper and said second stopper.*

*16. A brake apparatus as defined in claim 14, wherein said first stopper and said second stopper are flanges extending radially from said roller case.*

*17. A brake apparatus as defined in claim 10 further comprising a restrictor for axially restricting movement of said brake shoe means relative to said brake ring.*

*18. A brake apparatus as defined in claim 21 wherein said restrictor is located between said brake ring and said brake shoe means.*

*19. A brake apparatus as defined in claim 18, wherein said restrictor includes a spring for biasing said brake shoe means radially inwardly and a groove defined in said brake ring, said spring being located within said groove.*

*20. A brake apparatus as defined in claim 10, wherein said coupling element includes a spline.*

*21. A brake apparatus as defined in claim 10, wherein said coupling element includes splines extending substantially in an axial direction of said brake ring which are adapted to engage with splines provided at said hub.*

*22. A brake apparatus for coupling to and use with a bicycle hub that rotates around a hub shaft, said brake apparatus comprising:*

*a rotatable brake ring having a coupling element and a contact surface normal to a radial direction, said coupling element having a coupling structure which allows said coupling element to couple to the bicycle hub such that said coupling element is located radially between said brake ring and said hub and such that a relative rotation of said brake ring with respect to said bicycle hub is prohibited while allowing said brake ring to be moved axially of said hub shaft during assembly to and disassembly from said bicycle hub;*

*brake shoe means located radially inside said brake ring, said brake shoe having a brake shoe surface normal to said radial direction;*

*a brake control mechanism for moving said brake shoe means into braking contact with said contact surface of said brake ring; and*

*a lock nut adapted to engage said hub shaft to prevent said brake ring from moving axially from said bicycle hub such that disengaging said nut from said hub shaft allows said brake ring, said brake shoe means and said brake control mechanism to move axially of said hub shaft.*

*23. A brake apparatus as defined in claim 22, wherein said coupling element includes a spline.*

*24. A brake apparatus as defined in claim 22 further comprising a restrictor for axially restricting movement of said brake shoe means relative to said brake ring.*

* * * * *